United States Patent [19]

Kneer

[11] Patent Number: 5,415,307
[45] Date of Patent: May 16, 1995

[54] STOPPER FOR A RECEPTACLE AND METHOD OF MAKING THE RECEPTACLE

[75] Inventor: Roland Kneer, Farchant, Germany

[73] Assignee: Gaplast GmbH, Saulgrub, Germany

[21] Appl. No.: 145,954

[22] Filed: Oct. 29, 1993

[30] Foreign Application Priority Data

Oct. 30, 1992 [DE] Germany .................. 42 36 741.7

[51] Int. Cl.⁶ .............................................. B65D 41/00
[52] U.S. Cl. ..................................... 215/256; 215/254
[58] Field of Search ................ 215/252, 254, 256, 258

[56] References Cited

U.S. PATENT DOCUMENTS

| | | | |
|---|---|---|---|
| 4,147,268 | 4/1979 | Patel et al. | 215/258 |
| 4,461,390 | 7/1984 | Csaszar | 215/258 |
| 4,549,667 | 10/1985 | Dullabaun | 215/258 |
| 4,638,917 | 1/1987 | Persch | 215/252 |
| 4,669,623 | 6/1987 | Csaszar | 215/258 |
| 5,219,084 | 6/1993 | King | 215/252 |

*Primary Examiner*—David T. Fidei
*Attorney, Agent, or Firm*—Juettner Pyle Lloyd & Piontek

[57] ABSTRACT

To ensure the original state of the contents of a receptacle, the stopper comprises inwardly oriented blocking attachments on a surrounding tear-off sealing ring, with the blocking attachments gripping below an outwardly oriented annular projection of the receptacle. The blocking attachments are formed by lateral slides which cooperate with an inner contour sleeve. The sealing ring is respectively connected by a single tear-off web centrally between two adjacent blocking attachments to the upper circumferential wall. As a result, the finished stopper can be slid from the contour sleeve after cooling to 80°, the blocking attachments being smoothly guided on the guide surfaces of the contour sleeve. The sealing ring bulges elastically between two adjacent tear-off webs and subsequently assumes its original circular shape again.

6 Claims, 2 Drawing Sheets

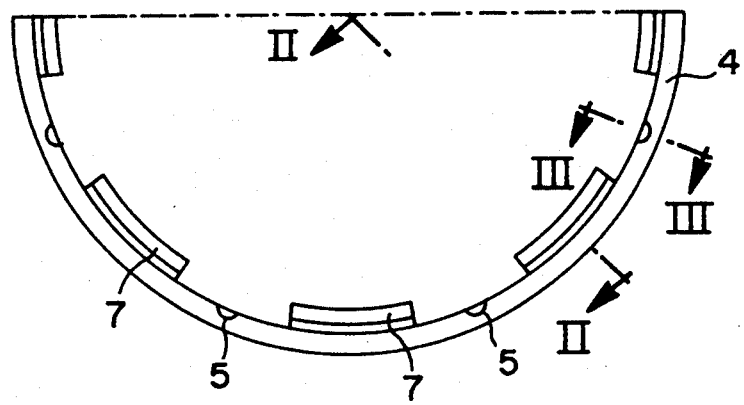
FIG. 1
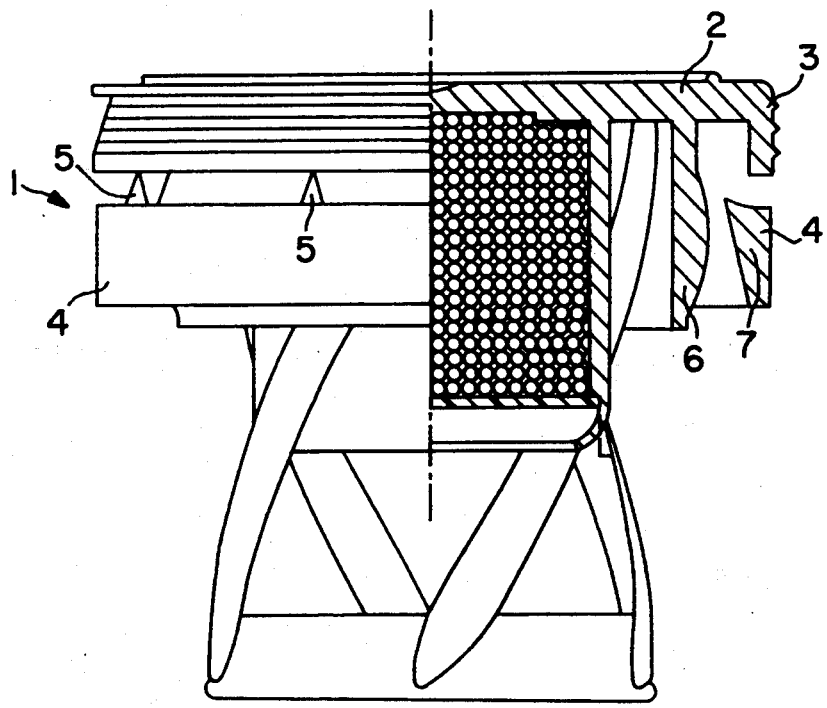
FIG. 2
FIG. 3

5,415,307

STOPPER FOR A RECEPTACLE AND METHOD OF MAKING THE RECEPTACLE

BACKGROUND OF THE INVENTION

This invention relates to a plastic stopper for a receptacle, with the stopper comprising a cover member with a circumferential wall which encompasses the neck of the receptacle and whose lower edge has molded thereon a surrounding tear-off sealing ring for ensuring the original state of the contents of the receptacle with inwardly oriented blocking attachments which grip below an outwardly facing annular projection of the receptacle in the secured position of the stopper.

The present invention also relates to a method for making such a stopper.

EP 0 202 506 A2 discloses a stopper whose sealing ring has molded thereon tabs which are oriented obliquely inwardly and into the stopper opening direction and which grip below a flanged edge of the receptacle. This stopper can be removed from the receptacle neck without damage to the predetermined break seam of the sealing ring if suitable tools are introduced below the sealing ring, and the tabs press against the sealing ring, whereupon the stopper can be removed from the neck of the receptacle. Such an unauthorized procedure requires some skill, but is possible in principle.

The prior-art stopper is produced with the aid of an injection mold with so-called dipping cores which grip behind the obliquely upwardly oriented tabs. Such a crown insert which is in permanent contact with the inner mold core and performs a relative movement with the latter tends to form undesired ridges and has a short service life. As a consequence, it must be replaced frequently. Apart from the increased material costs, the resultant idle times raise the production costs.

Moreover, recesses through which the dipping cores pass are provided in the cover portion of the prior-art stopper. Although these recesses are radially outside the receptacle opening, they permit the entry of foreign matter on the neck portion of the receptacle.

SUMMARY OF THE INVENTION

It is the object of the present invention to provide a stopper of the above type which can be produced with the aid of a reliably operating injection mold and which protects the edge portion of the receptacle opening effectively against soiling.

Another object of the invention is to provide a method for making such a stopper, which method is more reliable and makes the production of the stopper more inexpensive on the whole.

The stopper of the invention is provided with circumferentially extending recesses which pass through the sealing ring directly above the blocking portions and which respectively extend at both sides beyond the blocking portions, the sealing ring and the circumferential wall positioned thereabove being only interconnected on circumferential portions or at points positioned between the blocking attachments.

The blocking attachments or portions when viewed in cross-section, are formed by an enlargement of the wall thickness of the sealing ring without being cut free from the sealing ring proper.

This embodiment permits the production of the blocking portions by lateral slides of the mold which in the areas of the blocking attachments pass with radially inwardly facing projections through the cavity in which the upper circumferential wall of the stopper and the lower sealing ring are injection molded. The radially inner face of the projections of the slides closely comes to rest on a correspondingly formed surface of an inner contour sleeve of the mold, which will be described in more detail below. The face of the projections of the slides and the respectively associated contact surface of the inner contour sleeve are designed such that the molded stopper can be removed from the contour sleeve without the connection of the sealing ring with the upper circumferential wall of the stopper being damaged or torn.

Since the blocking attachment is formed by enlarging the wall thickness of the sealing ring without being cut free from the inner wall surface, as is the case with the stopper acknowledged, the shape of the blocking attachments can also not be varied by tools introduced below the sealing ring, so that they cannot be brought into an inoperative position thereby, as is the case with a tab that has been cut free. Hence, the contents of the receptacle is reliably protected against tampering.

The blocking attachment of the stopper of the invention advantageously includes an edge section which projects obliquely inwardly and in the direction of the cover member and which protrudes in pointed or hooked fashion upwards beyond the lower edge of the recess of the wall of the sealing ring proper and which solidly and reliably grips below the annular projection of the receptacle neck. It is possible to form the blocking attachment in the mold with the aid of the lateral slides of the mold without any difficulties.

In the stopper of the invention, the blocking attachments are thus not formed by a crown insert or dipping cores which must be guided through recesses of the cover member according to the above-mentioned prior art, but lateral slides, preferably three to four, are used for such a process. As far as these slides are concerned, no critical ridges are formed, and the slides have considerably longer service lives with correspondingly shorter idle times caused by the tools. Hence, the stopper according to the invention can be made in a more inexpensive way.

In another embodiment of the invention, the wall thickness of the blocking attachment may first increase gradually from the bottom to the top, whereby the wall broadens inwardly, for instance in wedge-shaped configuration, to remain constant in the area of the upper end section, i.e. the projecting hooked or pointed edge section, or to curve slightly in the manner of an arc. The inner contour of the blocking attachment may, however, be curved as well. It is important to note that the successive section of the contour sleeve is formed such that the blocking attachment can smoothly slide over the section when being removed from the mold without the sealing ring tearing partly or entirely.

To this end, the sealing ring is connected to the circumferential wall only by way of tear-off webs, and it is here of great advantage that only one web is centrally formed in the space between two adjacent blocking attachments. Apart from these few webs, the sealing ring is thus separated by an annular space from the circumferential wall.

As a consequence, upon removal from the mold, the sealing ring can deform outwards to a sufficient degree without the webs being torn off from the circumferential wall. When the blocking attachments are increasingly pressed radially to the outside on the obliquely outwardly oriented guide surface of the inner contour sleeve of the mold, the section of the sealing ring which is positioned between adjacent webs is elastically bulged outwards, the cross-section of the web in the attachment area on the circumferential wall being dimensioned such that the webs withstand the forces arising. After having been removed from the mold, the sealing ring assumes its initial shape because the removal process is carried out at a temperature at which the material used, preferably polyethylene or plasticized PVC or an elastomer, is predominantly fully elastic.

The blocking attachments preferably have about the same circumferential extension as the circumferential areas positioned thereinbetween. Since half of the circumference of the sealing ring blockingly grips below the annular projection of the associated receptacle, any tampering or unauthorized removal of the stopper is prevented.

As already mentioned, the circumferential wall and the sealing ring with the blocking attachments are formed in an injection mold having preferably three or four lateral slides and an inner contour sleeve, whereupon the plasticized polymer, introduced into the mold at 180° to 210° is cooled down to about 80° to pass from its thermoplastic state into a thermoelastic state. After the slides have been moved radially outwards, the stopper is slid axially up and away from the contour sleeve, the blocking sections smoothly sliding over the associated surfaces of the contour sleeve and the circumferential sections of the sealing ring positioned between the tear-off webs elastically bulging temporarily to assume a circular annular shape again after being removed from the mold.

The inner contour sleeve of the mold has recesses in the cylindrical outer surface, the contour of the recesses corresponding in the lower area to the radially inner surfaces of the blocking attachments and, in the successive area thereabove, to the face of the attachments of the lateral slides which form the recesses above the blocking attachments. That the upper area of the recess of the contour sleeve along which the molded blocking attachments slide during removal of the stopper forms a smooth continuous sliding surface without any steps or other irregularities. The guide surface which is of importance to the success of the removal process preferably extends in a straight line, so that the associated wall section of the sealing ring is evenly deformed to the outside. However, it is also within the scope of the invention that the guide surface may be slightly curved, which may especially be expedient on the initial and end portions thereof.

Other features, advantages and details of the invention will become apparent from the following description of a preferred embodiment of a stopper of the invention and from the drawing, in which:

BRIEF DESCRIPTION OF THE DRAWINGS

FIG. 1 is a horizontal sectional view through one half of the stopper in the area of the annular interspace between the sealing ring and the circumferential wall positioned above;

FIG. 2 is partly a lateral view and partly a vertical sectional view of the stopper according to FIG. 1 along line II—II in FIG. 1;

FIG. 3 is a vertical section through the edge portion of the stopper according to FIG. 1 along line III—III;

DESCRIPTION OF THE PREFERRED EMBODIMENTS

Figure 4:
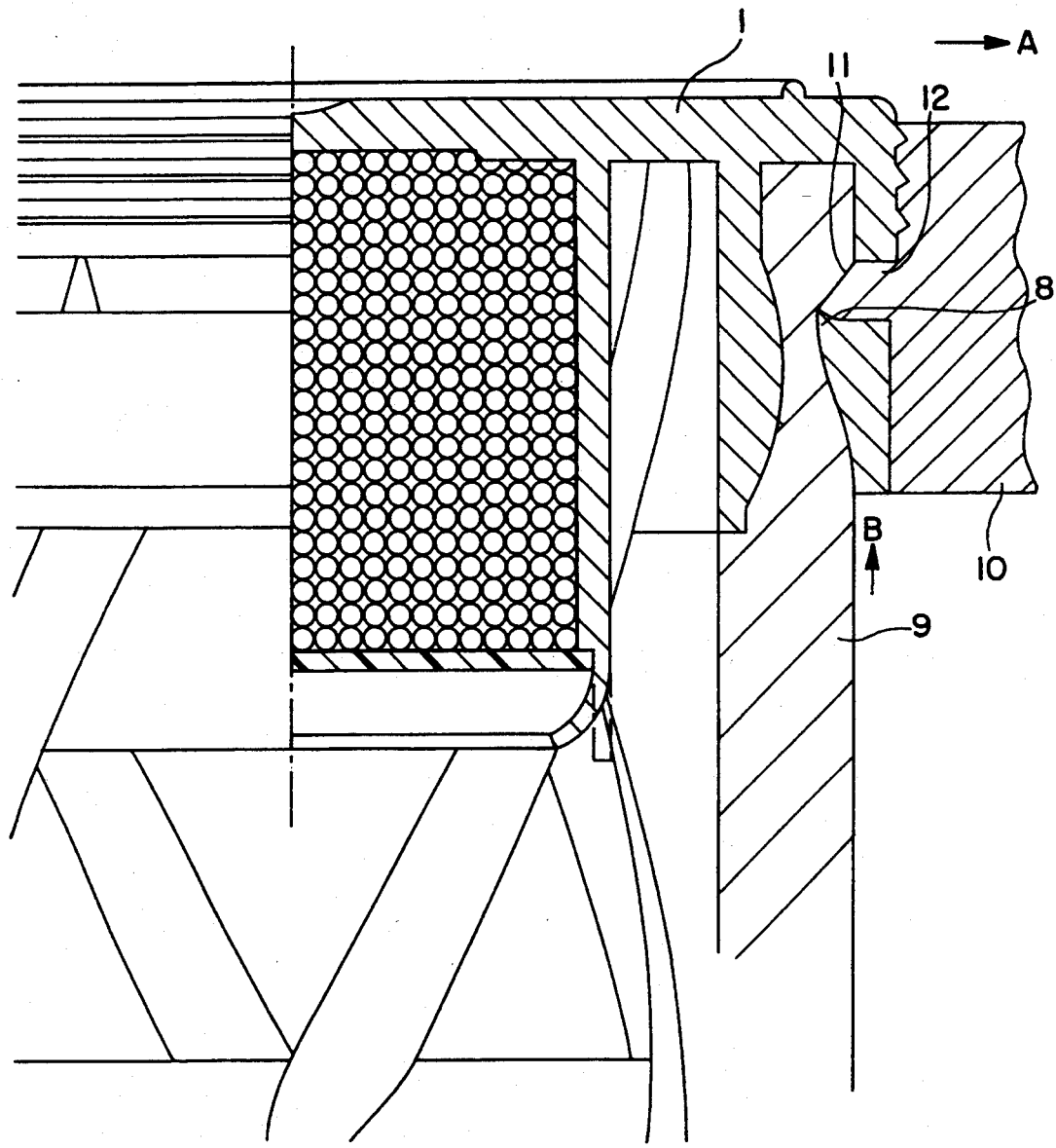
FIG. 4 is an enlarged illustration of FIG. 2 with members of the injection mold for forming the edge portion.

The figures show a stopper 1 of the invention with a flat top wall 2 and a circumferential wall 3 depending from the top wall and encompassing the upper edge or neck of a receptacle to be closed with the stopper. A sealing ring 4 which is connected via tear-off webs 5 to the circumferential wall 3 is positioned below the cirumferential wall 3. The tear-off webs 5 are shaped like half a circular cone, as becomes apparent from the joint consideration of FIGS. 1 and 3.

A cylindrical olive 6 which engages the neck of the receptacle and seals the neck in a press fit is molded on cover member 1 radially within the circumferential wall 3 and sealing ring 3 which is substantially in alignment therewith.

In the illustrated embodiment, eight blocking attachments 7 which are evenly spaced apart from one another circumferentially and have a circumferential extension substantially corresponding to the space between two adjacent blocking attachments 7 are molded on the inner wall of the sealing ring 4. As becomes more clearly apparent from FIG. 4, the blocking attachments are formed by increasing the wall thickness of the sealing ring 4, the wall thickness first increasing from the bottom to the top in a straight line in wedge-shaped configuration and passing in the manner of an arc into a vertical line in the area of an upper corner section 8 which pointedly projects upwards. The upper contour of the sealing ring with the blocking attachment 7 first extends horizontally and then at a flat angle upwards, whereby the pointed or hooked corner section 8 is formed, the latter gripping below an outwardly oriented annular projection (not shown) on the neck of the receptacle in such a way that the blocking attachments 7 cannot be pushed beyond the annular projection without the webs tearing off. The method of the invention for forming the edge portion of the stopper will be described further below with reference to FIG. 4.

Sealing ring 4 is connected via eight tear-off webs 5 to the circumferential wall 3, the tear-off webs 5 being evenly spaced apart from one another and each being arranged in the middle between adjacent blocking attachments 7. This gives the sealing ring 4 the necessary freedom of movement which in actual fact makes discharge from the injection mold possible. FIG. 3 shows a longitudinal section through one of the tear-off webs 5 extending upwards at an acute angle, whose cross-sectional dimension in the upper attachment portion on the circumferential wall 3 is such that the webs cannot tear off during removal from the mold.

FIG. 4 shows that the edge portion of stopper 1, which is of interest to the present invention, is produced with a mold that has a cylindrical contour sleeve 9 and a plurality of slides 10, in the present embodiment four slides, that form a radially outer ring. The contour sleeve 9 defines the olive 6 to be formed with its inner wall surface and has a circular cylindrical outer surface in which recesses are formed in the area of the blocking attachments 7 to be molded for creating a wall thickness of the sealing ring 4 in the area of the blocking attachments 7, the wall thickness increasing in a straight line or in arched fashion. An even, inclined guide surface 11 extends from the upper edge of the blocking attachments 7, i.e. the pointed edge portion 8, down to the lower inner corner point of the circumferential wall 3 to be formed. The slides 10 have a projection 12 which is annular and from which only eight recesses on the whole are recessed for the tear-off webs 7 for forming the annular space between the circumferential wall 3 and the safety ring 4. Moreover, the slides include radially inwardly facing attachments for forming the blocking attachments 7, the inwardly facing attachments terminating in a face corresponding to the guide surface 11 of the contour sleeve 9. These faces closely rest on the guide surfaces 11 of the contour sleeve 9 when the stopper is injection molded.

The stopper is injection molded from a plasticized plastic, whereupon the material, which is first thermoplastic, is cooled down to about 80°. The plasticized plastic is virtually fully elastic at this temperature. After the slides have been moved radially outwards (arrow A in FIG. 4), the stopper is removed in the direction of arrow B from the contour sleeve 9 (after the inner mold core has also been removed, so that olive 6 can move radially inwards).

During removal from the mold, the blocking attachments 7 slide smoothly along the guide surfaces 11 to the outside, the annular section which is respectively positioned between the tear-off webs being expanded outwards with an increasing bulge. The webs which also take part in the deformation process to a certain extent are dimensioned such that they withstand the stresses.

After the stopper has been removed from the mold, the sealing ring 4 assumes its initial shape.

In the cooled state the plasticized plastic looses most of its elasticity, so that in contrast to the removal process the sealing ring would not be expandable elastically to such an extent that the stopper could be "removed" from the neck of the receptacle without damage to the tear-off webs.

Since the slides do not slide along the contour sleeve 9 when the mold is opened or closed, ridges are not formed and the service life of the mold of the invention is considerably improved. Furthermore, the blocking attachments 7 which are solidly molded onto the sealing ring 4 make any manipulation with tools introduced from below into the sealing ring pointless because the blocking attachments 7 cannot be rendered ineffective thereby.

I claim:

1. A tamper-proof stopper for a receptacle having a neck, said stopper comprising an upper cover portion, an outer circumferential wall secured to and depending from said upper cover and encompassing the neck of the receptacle, an outwardly exposed tear-off sealing ring depending from said outer circumferential wall, said sealing ring comprising a plurality of spaced blocking tabs projecting obliquely inwardly and upwardly for locking relation against the neck of the receptacle, a plurality of openings directly above said blocking tabs between said circumferential wall and said tear-off sealing ring, said openings extending beyond the circumferential extent of the blocking tabs, and a plurality of tear-off webs connected between said circumferential wall and said sealing ring at locations between said blocking tabs, said tear-off webs providing the only connection between said circumferential wall and said sealing ring.

2. The stopper of claim 1 wherein each of said blocking tabs is formed, when viewed in cross-section, by an enlargement of the wall thickness of the sealing ring.

3. The stopper of claim 1 wherein said tear-off webs are located centrally between said blocking tabs.

4. The stopper of claim 1 wherein said tear-off webs have an upwardly tapered shape.

5. The stopper of claim 1 wherein the circumferential space between adjacent blocking tabs is about equal to the circumferential width of a blocking tab.

6. The stopper of claim 1 wherein said stopper is composed of a thermoplastic polymer.

* * * * *